United States Patent [19]

Nordengren

[11] 4,139,465
[45] Feb. 13, 1979

[54] METHOD FOR WASHING FILTER-CAKES AND A SPRAY NOZZLE INTENDED FOR USE WITH THE METHOD

[75] Inventor: Rolf G. J. Nordengren, Landskrona, Sweden

[73] Assignee: Nordengren Patenter AB, Landskrona, Sweden

[21] Appl. No.: 833,544

[22] Filed: Sep. 15, 1977

[30] Foreign Application Priority Data

Nov. 26, 1976 [SE] Sweden .................................. 7613311

[51] Int. Cl.² ............................................. B01D 41/00
[52] U.S. Cl. ........................................ 210/81; 210/391
[58] Field of Search ............... 210/393, 396, 391, 400, 210/401, 79, 81

[56] References Cited

U.S. PATENT DOCUMENTS

| | | | |
|---|---|---|---|
| 2,669,360 | 2/1954 | Little | 210/396 |
| 2,848,113 | 8/1958 | Paterson et al. | 210/393 |
| 2,983,383 | 5/1961 | Wallace et al. | 210/391 |
| 3,469,703 | 9/1969 | Parmentier | 210/393 |
| 4,038,193 | 7/1977 | Van Oosten | 210/400 |

*Primary Examiner*—William A. Cuchlinski, Jr.
*Assistant Examiner*—Jon E. Hokanson
*Attorney, Agent, or Firm*—Fred Philpitt

[57] ABSTRACT

The present invention is concerned with a method for washing filter-cakes and a spray nozzle intended for use with the method.

The invention provides a method of washing filter-cakes transported by a rotary belt filter, the filter-cake being caused to pass along a washing station by means of a conveyor belt having longitudinally extending side ridges and being smoothed by means of a doctor, in which method washing liquid is dispersed over the filter-cake and caused to pass there through by means of a vacuum on the undersurface of the filter-cake, wherein washing liquid is supplied to the filter-cake in the form of a laminar flow across the major portion of the width of the filter-cake, said flow having a slight turbulence in a zone adjacent each side ridge.

6 Claims, 3 Drawing Figures

U.S. Patent  Feb. 13, 1979  Sheet 2 of 2  4,139,465
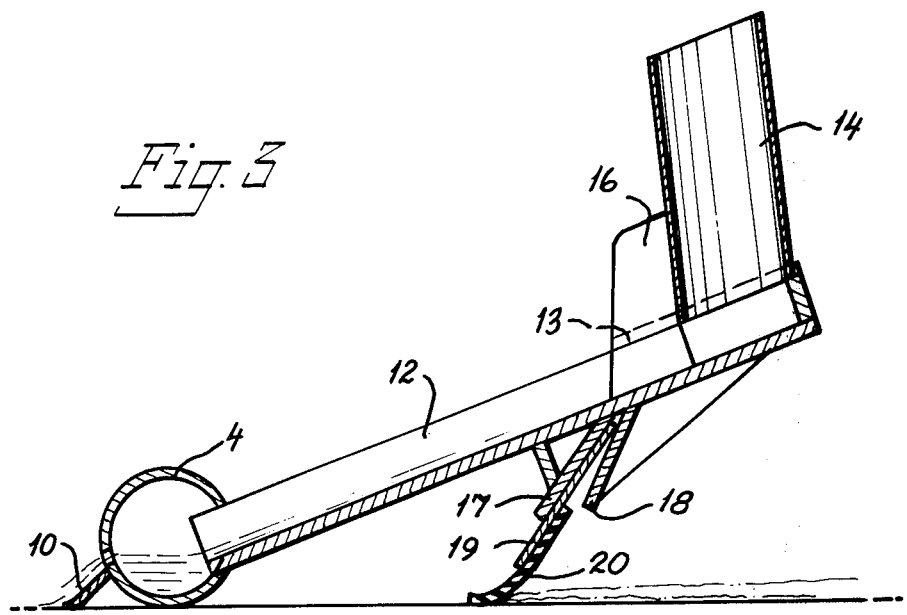

METHOD FOR WASHING FILTER-CAKES AND A SPRAY NOZZLE INTENDED FOR USE WITH THE METHOD

The present invention relates to a method for washing filter-cakes on a rotary band filter, and to a spray nozzle for carrying out the method.

Within the heavy-process industry, it is often necessary to recover a certain product by a filtering operation. One example of such processes is found in the manufacture of phosphoric acid by reacting minerals rich in phosphorus, such as apatite, with a mineral acid such as sulfuric acid. In such a reaction, there is obtained a reaction mixture containing calcium sulfate (gypsum) and phosphoric acid. In order to separate the obtained acid from the calcium sulfate formed, there is normally used a filter of the so-called continuous band type. Such filters comprise a frame which carries the essential parts of the filter, these essential parts being a rotable conveyor belt, normally made of vulcanised rubber or the like, and a filter cloth arranged to be moved into contact with the conveyor belt during part of its rotary movement, during which part of said movement the reaction mixture containing liquid material, such as phosphoric acid, to be recovered, is supplied to the filter on the upper side of the filter cloth, whereupon the liquid material is caused to pass through the openings of the filter cloth and the solid material is retained on the upper surface of said cloth. In order to illustrate the background of the invention, there will now be described a filter particularly intended for use in the manufacture of phosphoric acid. In this particular case, the filter comprises an endless belt made preferably of reinforced rubber or the like. The belt is provided with transverse ribs and is arranged to move between two terminal rollers which in addition to guiding the belt also tensions it to the extent required for the functioning of the filter. The belt is also provided with longitudinally extending ede portions each of which exhibits a ridge. The height of the ridges is such that the upper surface of the ribbed belt and the shallow groove-like space defining said upper surface can receive a filter-cake having a thickness of approximately 100 mm, said thickness being uniformly distributed over the whole of the groove-like shape. The ribbed belt is perforated along an imaginary line which passes centrally of the belt parallel with its longitudinal direction. The filter cloth is caused to rest on the ribs of the belt along the filtering zone of the filter. During that phase of the rotary belt in which the belt returns, the filter cloth is completely separated from the belt. This simplifies the cleaning of the belt and the filter cloth, for example by spraying the same with water. During that phase of belt movement in which the filter cloth rests on the upper surface of the ribbed belt, the under surface of the belt is in sealing contact with a plurality of suction boxes which communicate with a source of vacuum. Liquid to be recovered, and also wash liquid present in other zones, pass, under the influence of the vacuum, through perforations to the suction boxes and further to a collecting vessel.

One problem associated with the washing of filter-cakes, for example obtained in the manufacture of phosporic acid by reacting phosphoric minerals and sulfuric acid on rotary belt filters, is one in which when liquid is removed from the filter-cake by suction there is formed a narrow gap adjacent each ridge on the side of the rotary belt. As a result of this gap, the resistance of liquid flow through the filter-cake reduces and a large portion of the washed liquid will pass through the filter cloth via the gap on each side thereof, thereby impairing the washing effect.

It has now been found that this disadvantage can be overcome if the liquid with which the filter-cake is washed is supplied to the upper surface of the filter-cake in a manner such that the portion of the washing liquid supplied to the zone adjacent the side beads of the rotary belt is given a weak turbulence while that part of the washing liquid supplied over the major portion of the width of the filter-cake is imparted a laminar flow.

According to the invention there is provided a method of washing filter-cakes transported by a rotary belt filter, the filter-cake being caused to pass along a washing station by means of a conveyor belt having longitudinally extending side ridges and being smoothed by means of a doctor, in which method washing liquid is dispersed over the filter-cake and caused to pass therethrough by means of a vacuum on the under surface of the filter-cake, wherein washing liquid is supplied to the filter-cake in the form of a laminar flow across the major portion of the width of the filter-cake, said flow having a slight turbulence in a zone adjacent each side ridge.

According to the invention there is also provided a dispenser nozzle intended for use in carrying out the method of the invention. More particularly, there is provided a nozzle for washing liquid for washing filter-cakes, such as gypsum in the manufacture of phosphoric acid, the filter-cake being transported by a conveyor belt having longitudinally extending side ridges, said nozzle comprising a transversely extending chute having a centre portion which extends over the major part of the width of the conveyor belt, and an end portion at each of said side ridges, said chute being covered along the centre portion by a cover member having disposed therein a plurality of narrow slots and a drainage plate mounted adjacent the slots in said chute, said drainage plate being arranged to receive the washing liquid flowing from the slots and to spread said liquid in the form of laminar flow over the filter-cake, and wherein at each end portion the chute is constructed to serve as a weir for washing liquid and to impart to the liquid in each of the zones of the filter-cake adjacent to the side ridges of the conveyor belt a slight turbulence.

Other features of the present invention will be apparent from the following description, which is made with reference to the accompanying drawings, these drawings illustrating a dispenser nozzle in more detail.

In the drawings,

FIG. 3 is a side view of said nozzle when in its operative state.

Figure 1:
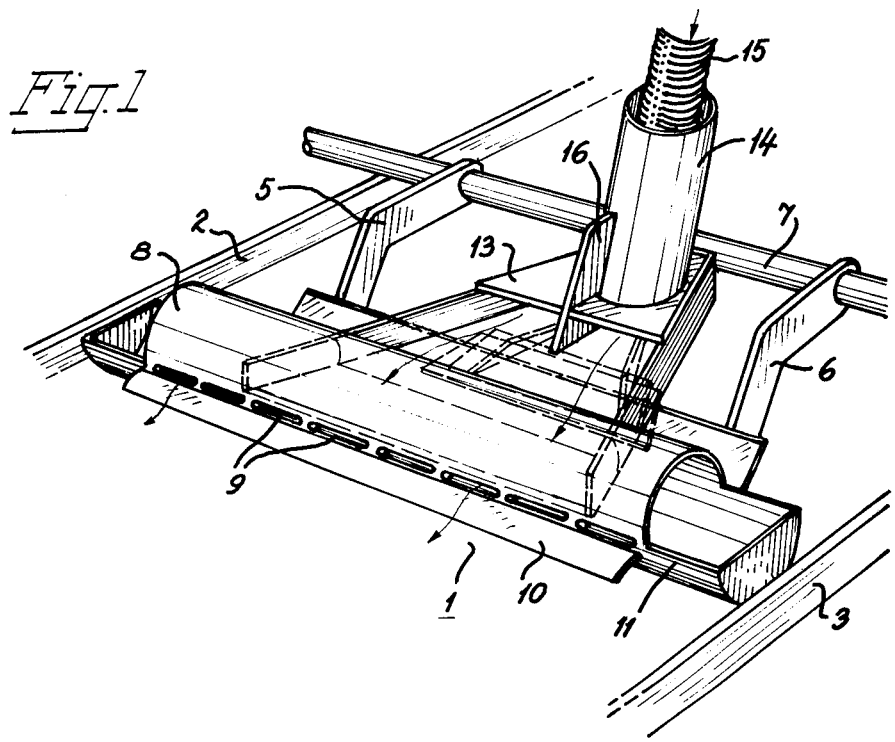
FIG. 1 is a perspective view of a dispenser nozzle.
Figure 2:
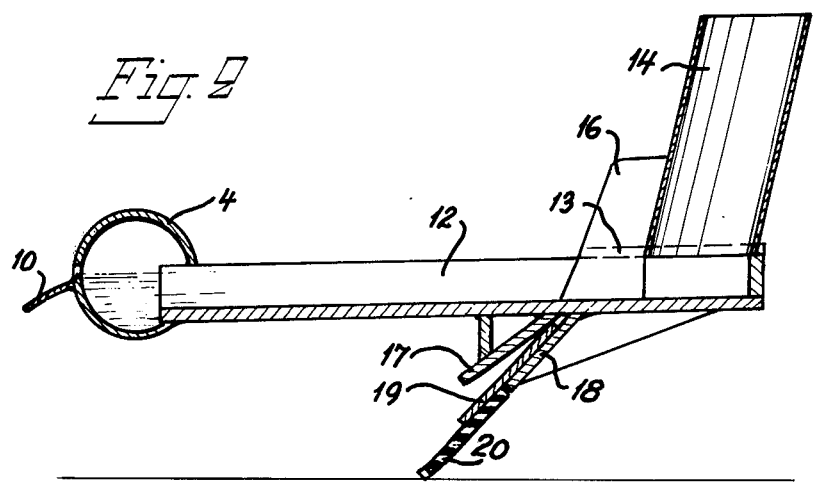
FIG. 2 is a side view of the nozzle and shows the nozzle in an inoperative state.

In FIG. 1 there is shown part of the rotary belt 1 of a rotary belt filter for filtering sludge obtained in the manufacture of phosphoric acid from apatite and sulfuric acid, with a dispenser nozzle for washing liquid being arranged above the filter. The rotary belt is arranged to pass over a rotatable roller arranged at respective ends of the belt, the rollers being carried in a filter frame. On either side of the frame there is a ridge 2,3 which defines there between a shallow space arranged to receive the filter-cake to be washed.

The dispensing nozzle comprises a transversely extending chute 4 of circular cross section. The chute 4 is covered along a large portion of its length with a roof portion 8, also of circular cross section, formed integrally with the chute 4. The roof 8 is provided with a plurality of slots 9 taken along a line located on a level with the upper edge of the chute. Adjacent to the slots there is arranged a draining strip 10 for liquid from the nozzle. Flows of washing liquid from the slots are received on the upper surface of the strip 10 to form a laminar flow which runs down onto the upper surface of the filter-cake without disturbing the laminar character of the flow. Owing to the fact that the roof 8 does not cover the end portions of the chute, the top edge of the chute serves as a weir 11 for washing liquid, thereby to impart to said liquid in the region of said weir a slight turbulence. Connected to chute 4 is an inlet pipe 12 which is open for inspection purposes and which narrows in a direction from the chute 4 towards a portion covered by a planar cover plate 13, to which plate 13 there is attached an inlet pipe. The inlet pipe 14 is connected to a flexible pipe 15 leading to a source of washing water. The attachment of inlet pipe 14 to the cover plate 13 is reinforced by means of a stay plate 16 attached in the inlet pipe and extended through the cover plate 13 and attached to the bottom of the inlet pipe 12.

Mounted on the underside of the inlet pipe 12 are two obliquely positioned plates 17,18, which when seen in cross section, form an acute angle with the apex of the angle adjacent the attachment point of the plates to the inlet pipe 12.

The angular space between the plates 17,18, when viewed in cross section, forms a seat for a carrier plate 19 carried by two arms 5,6, as shown in FIG. 1, said arms, in turn, being attached to a transverse stay 17. This latter is mounted on the filter frame (not shown). Thus, the nozzle with the flexible tube 15 is carried by the carrier plate 19. As a result of the obliquely positioned plates 17,18, the nozzle is able to pivot between two limit positions. The geometric pivot access of the nozzle is so located that when the nozzle is filled with washing liquid, the undersurface of the chute 4 lightly abuts and runs against the filter-cake in the space between the ridges 2,3. This position is shown in FIG. 3. Washing liquid runs out through the slots 9 and passes over the draining strip 10, from where it runs down onto the upper surface of the filter-cake with the smallest possible freefall distance while maintaining a laminar character of the flow. The two obliquely positioned plates 17,18 define the pivot range of the nozzle, the plate 18 preventing the nozzle from swinging excessively from the operating position, while the plate 17 prevents the undersurface of the nozzle from touching the filter cloth during those periods of filter operation when the filter cloth must be cleaned to remove solid material from the openings of the cloth, provided that no sludge is present on the cloth.

In addition to serving as a carrier plate for the washing nozzle, the plate 19 also serves to divide the filter surface into different washing zones. To this end, the plate 19 is provided with a strip of flexible material 20, preferably rubber, along its underedge and side edges. The side portions of the strip 20 abut the inside of the two ridges 2,3 whilst the underedge of the strip serves as a doctor blade on the upper side of the sludge cake present on the filter. This is also shown in FIG. 3.

What is claimed is:

1. In the known method of washing a filter cake that is supported on a liquid permeable conveying means having longitudinally extending side ridges to laterally confine the filter cake and wherein washing liquid is delivered to the surface of the filter cake and the washing caused to pass therethrough by applying a vacuum to the undersurface of the filter cake, the improvement which comprises
    (a) delivering washing liquid in slightly turbulent flow to the portions of the filter cake that are adjacent each of said side ridges, and
    (b) delivering washing liquid to the remaining portion of the filter cake in laminar flow.

2. In the known device for washing a filter cake that is supported on a liquid permeable conveying means between longitudinally extending side ridges that laterally confine the filter cake, said known device including the combination of an inlet conduit for liquid and a liquid dispensing member attached to said inlet conduit, the improvement in said liquid dispensing member comprising
    (a) said liquid dispensing member containing a reservoir section that will hold a supply of liquid fed thereto through said inlet conduit,
    (b) said liquid dispensing member having two different means disposed along one side thereof for delivering liquid from its reservoir section to the filter cake, said two different liquid delivery means including:
        (1) a weir means located adjacent each of the outer upper ends of said reservoir section which permit the liquid to flow thereover and then drop vertically downwardly in slightly turbulent flow upon the surface of the filter cake that is deposited adjacent said side ridges, and
        (2) a sloping flow means extending between the inner ends of said two weir means and sloping gradually downwardly from the top of said reservoir to said filter cake so that the liquid thereby delivered to the filter cake will be in essentially laminar flow.

3. A device according to claim 2 wherein said plurality of spaced apart slotted openings extend between said liquid reservoir section and said sloping flow means.

4. A device according to claim 2 which includes mounting means for pivotally mounting said device so that it can be pivoted with respect to the conveyor belt.

5. A device according to claim 4 wherein a doctor blade is connected to said mounting means.

6. A device according to claim 5 which additionally includes two diverging plates which limit the extent of movement of said device with respect to said doctor blade.

* * * * *